United States Patent [19]

Yoneyama

[11] Patent Number: 5,764,396
[45] Date of Patent: Jun. 9, 1998

[54] OPTICAL REGENERATIVE CIRCUIT

[75] Inventor: Kenichi Yoneyama, Tokyo, Japan

[73] Assignee: NEC Corporation, Tokyo, Japan

[21] Appl. No.: 618,590

[22] Filed: Mar. 20, 1996

[30] Foreign Application Priority Data

Mar. 24, 1995 [JP] Japan .................................. 7-065591

[51] Int. Cl.⁶ .................................................. H04B 10/02
[52] U.S. Cl. ............................................ 359/176; 359/140
[58] Field of Search ........................... 359/135, 138–140, 359/158, 174–176, 179; 375/214

[56] References Cited

U.S. PATENT DOCUMENTS

| | | | |
|---|---|---|---|
| 4,350,879 | 9/1982 | Feher | 377/28 |
| 4,561,101 | 12/1985 | Pinsard et al. | |
| 5,369,520 | 11/1994 | Auramopoulos et al. | 359/176 |
| 5,392,147 | 2/1995 | Kaede et al. | 359/181 |
| 5,459,607 | 10/1995 | Fellows et al. | 359/138 |
| 5,493,433 | 2/1996 | Prucnal et al. | 359/123 |
| 5,548,433 | 8/1996 | Smithy | 359/158 |
| 5,646,759 | 7/1997 | Lichtman et al. | 359/138 |

FOREIGN PATENT DOCUMENTS

| | | |
|---|---|---|
| 0555063A2 | 8/1993 | European Pat. Off. . |
| 2234129 | 1/1991 | United Kingdom . |

OTHER PUBLICATIONS

Optical Fiber Communication, Technical Digest vol. 8, 1995, pp. 127–129 entitled "Noise Compression and Waveform Restoration by Optical Signal Regenerator" by Yutaka Yano, Takashi Ono and Naoya Henmi.

*Primary Examiner*—Rafael Bacares
*Attorney, Agent, or Firm*—Scully, Scott, Murphy & Presser

[57] ABSTRACT

The optical regenerative circuit comprises: branching circuit for supplying a received optical data signal to two branch circuits; optical clock generator circuit for generating an optical clock signal from a first optical data signal, the first optical data signal being the optical data signal supplied to a first branch circuit of the two branch circuits; optical discriminating circuit for discriminating in an optical form a logic level of a second optical data signal in synchronization with the optical clock signal produced by the optical clock generator circuit, the second optical data signal being the optical data signal supplied to a second branch circuit of the two branch circuits; and variable-delay circuit for adjusting timings at which the second optical data signal and the optical clock signal are received by the optical discriminating circuit, by delaying a predetermined one of the first optical data signal, the second optical data signal and the optical clock signal so that the timings are synchronized with each other.

11 Claims, 5 Drawing Sheets

OPTICAL REGENERATIVE CIRCUIT

BACKGROUND OF THE INVENTION

The present invention relates to an optical regenerative circuit, particularly to the optical regenerative circuit used for an optical repeater.

In the field of optical communications, investigations of the technology have been developed to treat an optical signal as it is in an optical form without transducing it to a signal such as an electric signal, in order to realize an extreme high speed of transmission. In particular, in the field of optical repetitive transmission, efforts have been made to cancel noise mixed in an optical signal, taking advantage of regeneration of the optical signal.

FIG. 1 shows the structure of the optical regenerative circuit of prior art for the optical regeneration as described above.

As represented in the figure, the optical regenerative circuit is made up of optical branching circuit 11, optical clock generator 12 and optical discriminator 14.

An optical data signal 21 supplied to the optical regenerative circuit is split into two branches by the branching circuit 11 and supplied to both of the optical clock generator 12 and the optical discriminator 14.

The optical clock generator 12 generates an optical clock signal 22 on the basis of the branched optical data signal $21_B$, while the optical discriminator 14, synchronized with the optical clock signal 22 generated by the optical clock generator 12, performs regeneration of the optical data signal $21_A$, thereby providing an output of the optical data signal 23 free from noise.

Ordinary, a mode-locked laser diode (ML-LD) is used as an optical clock generator and an optical AND gate called a nonlinear optical loop mirror (NOLM) is used as an optical discriminator.

In order to properly operate the above-described optical regenerative circuit, it is necessary to synchronize the input timings to the optical discriminator circuit of the optical data signal and the optical clock signal with each other.

The adjustment of the input timings of these signals has been conventionally performed by adjusting the optical transmission path length of the optical alignment made up of mirrors, prisms and lenses.

In this optical regenerative circuit of prior art, however, a problem has been that timing adjustment is complicated, and vibration-proof capability and reliability are degraded.

It is an object of the present invention to offer an optical regenerative circuit which allows an easy timing adjustment.

SUMMARY OF THE INVENTION

In order to attain the object of the present invention, the first optical regenerative circuit of the present invention comprises branching means, optical clock generating means, optical discriminating means and variable-delay means.

Branching means supplies a received optical data signal to two branch circuits.

Optical clock generator means generates an optical clock signal from a first optical data signal, wherein the first optical data signal is an optical data signal supplied to a first branch circuit of the two branch circuits.

Optical discriminating means discriminates, in an optical form, a logic level of a second optical data signal in synchronization with the optical clock signal produced by the optical clock generator means, wherein the second optical data signal is an optical data signal supplied to a second branch circuit of the two branch circuits.

Variable-delay means adjusts the timings at which the second optical data signal and the optical clock signal are received by the optical discriminating means, by delaying a predetermined one of the first optical data signal, the second optical data signal and the optical clock signal so that the timings are synchronized with each other, wherein the variable-delay means has at least one optical path to pass the predetermined one of the first optical data signal, the second optical data signal and the optical clock signal, and the propagation time of the at least one optical path is controlled by means of a control signal to establish a delay time of the predetermined one of the first optical data signal, the second optical data signal and the optical clock signal.

Three ways are possible to adjust the timings.

A first way is to delay the optical clock signal.

A second way is to delay the first optical data signal from which the optical clock signal is generated.

A third way is to delay the second optical data signal.

In other words, the relative phase of the optical clock signal to the second optical data signal can be adjusted by delaying one of the three optical signals, i.e., the first optical data signal, the second optical data signal, or the optical clock signal.

The optical signal to be delayed is passed through the optical path having a propagation time which is controllable by a control signal.

In this way, the relative input timing of the second optical data signal to the optical clock signal is easily adjusted under control of a control signal.

In the first way above, the variable-delay means delays the optical clock signal produced by the optical clock generator means, and the optical discriminating means discriminates a logic level of the second optical data signal in synchronization with the optical clock signal delayed by the variable-delay means.

In the second way above, the variable-delay means delays the first optical data signal, optical clock generator means generates an optical clock signal from the first optical data signal delayed by the variable-delay means, and optical discriminating means discriminates a logic level of the second optical data signal in synchronization with the optical clock signal produced by the optical clock generator.

In the third way above, variable-delay means delays the second optical data signal, optical discriminating means discriminates a logic level of the second optical data signal delayed by the variable-delay means in synchronization with the optical clock signal produced by the optical clock generator means.

The variable-delay means preferably has a plurality of optical paths of different propagation times, and a delay time of the optical signal to be delayed is established by selecting, under control of a control signal, one of the plurality of optical paths as an optical path for the optical signal to be delayed.

In this way, an appropriate delay time can be obtained by selecting an optical path of a desired propagation time by means of a control signal.

The variable-delay means can be provided with a plurality of optical waveguides (or optical fibers) having different propagation times, each of the optical waveguides (or optical fibers) having an optical blocking means for passing or blocking an optical signal in accordance with a control signal; optical coupling means for coupling the output ends of the plurality of optical waveguides (optical fibers) to an optical waveguides (an optical fiber) to transmit the output of the variable-delay means; and distributing means for distributing a received optical signal to supply to each of the plurality of optical waveguides (optical fibers).

While the distributing means distributes an optical signal to all of the plurality of the optical waveguides (or optical fibers), one of the plurality of the optical waveguides (or optical fibers) having the desired propagation time can be selected by the control signal, thereby allowing the supplied optical signal to have a desired time lag.

The variable-delay means can be provided with a plurality of optical waveguides (optical fibers) having different propagation times; optical coupling means for coupling the output ends of the plurality of optical waveguides (or optical fibers) to an optical waveguide ( or an optical fiber) for coupling the output of the variable-delay means to the next stage; and selectively supplying means for supplying a received optical signal selectively to one of the plurality of optical waveguides (or optical fibers) in response to an externally supplied control signal.

In this preferable arrangement, an optical waveguide ( or an optical fiber ) having a desired propagation time is selected by the selectively supplying means depending on the control signal.

While, in the variable-delay means described above, one optical path of a desired propagation time is selected from a plurality of optical paths having different propagation times, it is also possible to utilize a single optical path of a controllable propagation characteristic.

As an example of such a type of an arrangement, the variable-delay means has a single optical waveguide having a propagation time which depends on a dielectric constant of the waveguide, wherein the dielectric constant varies in response to an externally supplied control signal, and a delay time of the optical signal to be delayed is established by selecting the value of the dielectric constant by means of the control signal.

As another example of this type of an arrangement, the variable-delay means has a single optical fiber having a propagation time which depends on an optical path length of the optical fiber, wherein the optical path length varies in response to a magnitude of an externally applied tensile force, and a delay time of the optical signal to be delayed is established by selecting the magnitude of the tensile force under control of an control signal.

The present invention offers the advantage that, since the timing adjustment between the optical data signal and the optical clock signal can be attained under control of a control signal, it is quite easy to adjust a state of the optical regenerative circuit so as to allow an accurate optical regeneration.

In addition, since the optical regenerative circuit having the above constituent features has a high vibration-proof capability and reliability as well as being easily miniaturizable, the optical regenerative circuit of the present invention offers a superior practical utility.

The above and other objects, features, and advantages of the present invention will become apparent from the following description referring to the accompanying drawings which illustrate examples of the preferred embodiments of the present invention.

DETAILED DESCRIPTION OF THE PREFERRED EMBODIMENTS

Now the preferred embodiments of the present invention will be given below.

Figure 1:
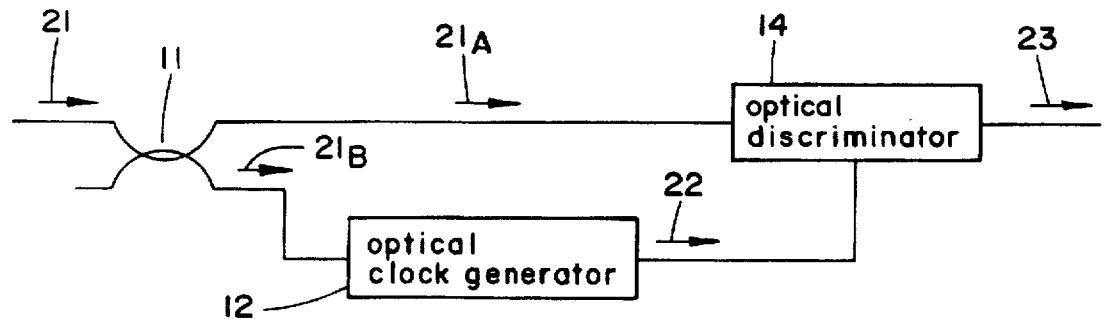
FIG. 1 shows the structure of the optical regenerative circuit of prior art.
Figure 2:
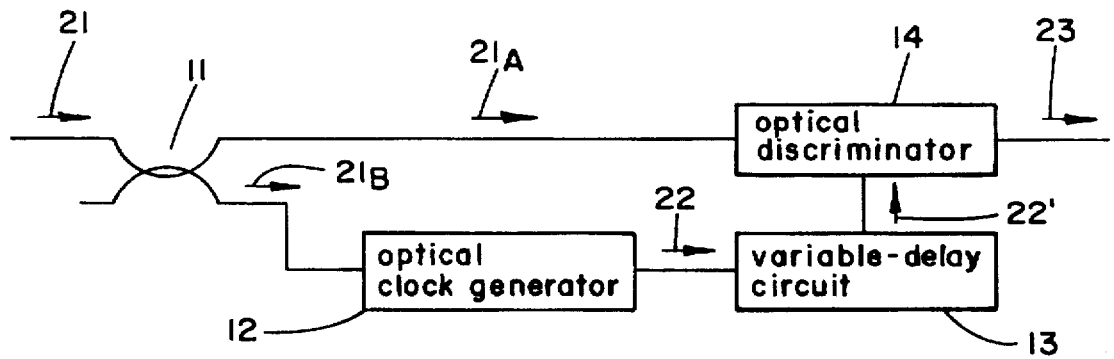
FIG. 2 illustrates the structure of the optical regenerative circuit according to the first embodiment of the present invention.

FIG. 2 illustrates the structure of the optical regenerative circuit according to the first embodiment of the present invention.

The optical regenerative circuit is made up of an optical branching circuit 11, an optical clock generator 12, an optical variable-delay circuit 13 and an optical discriminator 14.

An optical data signal 21 supplied to the optical regenerative circuit is branched off to two branch circuits by optical branching circuit 11, one of the two branched signals being supplied to the optical clock generator 12 and the other to the optical discriminator 14.

In the present embodiment as well, a mode-locked laser diode (ML–LD) is used as an optical clock generator and a nonlinear optical loop mirror (NOLM) is used as an optical discriminator.

The optical clock generator 12 generates an optical clock signal from the branched optical data signal $21_B$ and supplies the optical clock signal to the variable-delay circuit 13.

The variable-delay circuit 13 is an optical circuit which delays the supplied optical signal, capable of varying the delay time in response to an external control signal.

The optical clock signal 22' which is an optical clock signal delayed by the variable-delay circuit 13 is supplied to the optical discriminator 14 and is used for discriminating the optical data signal $22_A$.

Figure 3:
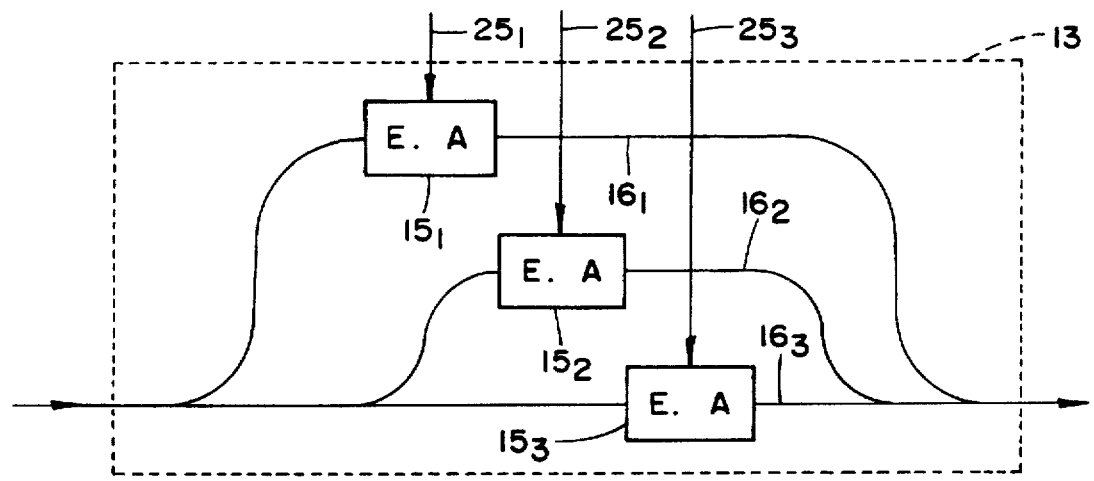
FIG. 3 illustrates a structure of the variabledelay circuit used in the first embodiment of the optical regenerative circuit of the present invention.

FIG. 3 illustrates a structure of the variable-delay circuit used in the first embodiment of the optical regenerative circuit of the present invention.

The variable-delay circuit 13 comprises a plurality of optical waveguides 16 ( $16_1$, $16_2$, $16_3$ ) having optical paths of a different length arranged between the input and output ends of the variable-delay circuit 13.

Each of the optical waveguides has an electroabsorption (EA) modulator 15 ( $15_1$, $15_2$, $15_3$ ) which is supplied with an external control signal 25 ( $25_1$, $25_2$, $25_3$ ) so that selected one of the EA modulators is placed in the minimum loss state (the ON state) and the others in the maximum loss state (the OFF state). In other words, the EA modulators in the variable-delay circuit are controlled so that an optical signal supplied to the variable-delay circuit will propagate only through the selected optical waveguide (the ON state waveguide) 16 having a desired delay time.

By virtue of this arrangement of the variable-delay delay circuit, a desired delay relative to the phase of the supplied optical signal can be attained corresponding to the optical path length.

In this way, it is quite easy in the optical regenerative circuit of the present invention to carry out the timing adjustment of the optical data signal to be discriminated relative to the optical clock signal by selecting an optical waveguide of a desired propagation time under control of an externally supplied control signal.

Figure 4:
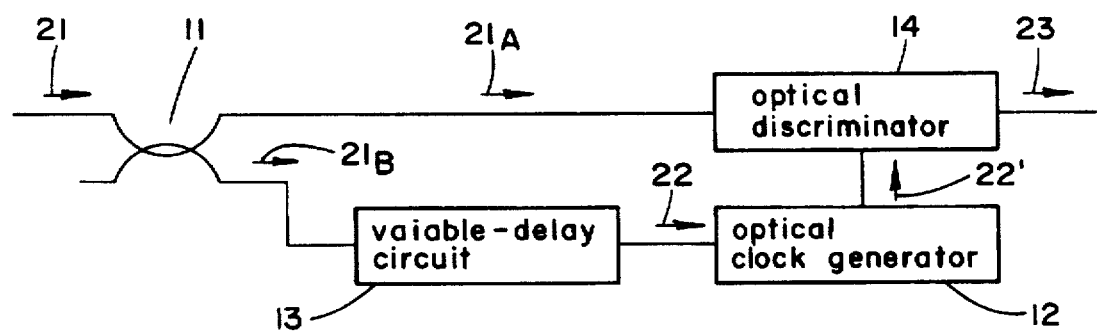
FIG. 4 is a block diagram of a second embodiment of the present invention.

FIG. 4 is a block diagram of a second embodiment of the present invention.

While in the previous embodiment the variable-delay circuit 13 is arranged in the following stage of optical clock generator 12, the variable-delay circuit 13 of the present embodiment is arranged between optical branching circuit 11 and optical clock generator 12.

In this circuit, relative timing adjustment of the optical clock signal 22 and optical data signal $21_A$ is performed by delaying the optical data signal $21_B$.

Figure 5:
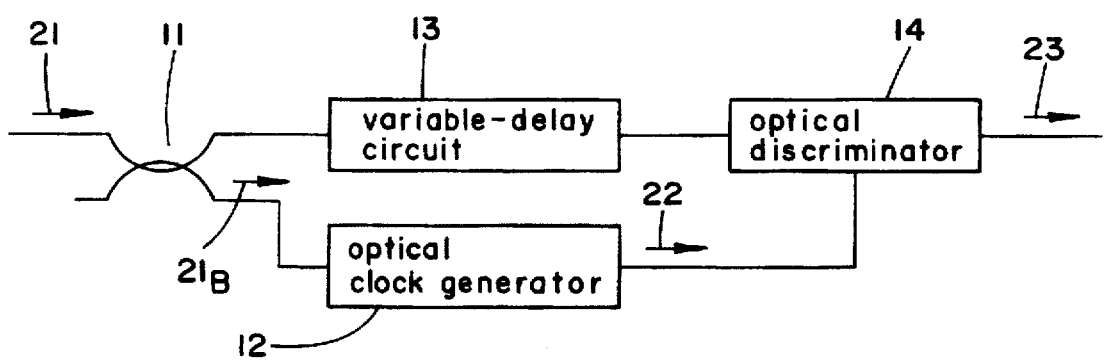
FIG. 5 is a block diagram of a third embodiment of the present invention.

FIG. 5 is a block diagram of a third embodiment of the present invention.

In this embodiment, the variable-delay circuit 13 is arranged between optical branching circuit 11 and optical discriminator circuit 14.

By this arrangement, the timing adjustment is performed by delaying the optical data signal $21_A$.

In the above first to third embodiments, a plurality of optical waveguides having different optical path lengths are used as the variable-delay circuit 13, as is shown in FIG. 3.

It is essential, however, for the variable-delay circuit of this type that the plurality of optical waveguides have different optical propagation times rather than different optical path lengths.

Good experimental results have been obtained by employing, in lieu of the optical waveguides of different optical path lengths, optical waveguides having the same optical path length but different refractive indexes.

Good experimental results have been also obtained by employing, in lieu of the optical waveguides, optical fibers arranged similarly to the variable-delay circuit described above.

While the variable-delay circuits of the first to third embodiments have optical circuits for passing or blocking an optical signal (an E.A modulator) every optical waveguide, it is possible to replace the passing/blocking circuit such as an E.A. modulator with an optical switch capable of coupling an input optical signal selectively to one of a plurality of optical paths.

FIG. 6 shows schematically represented examples of variable-delay circuits with such optical switches.

The variable-delay circuit represented in A is provided with the optical switch at the input end, while the circuit represented in B is provided with the optical switches both at the input and output ends.

Figure 6A:
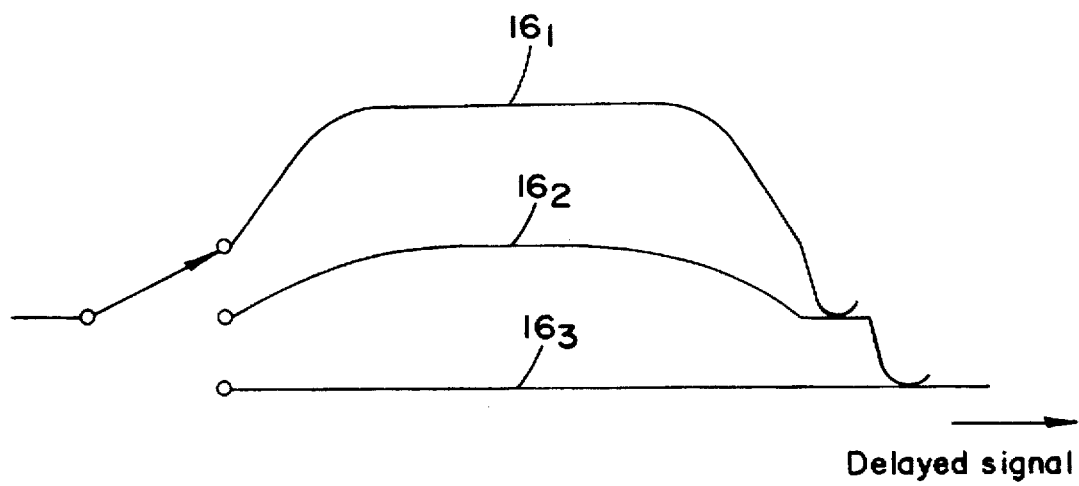
FIG. 6 shows schematically represented examples of variable-delay circuits with optical switches.

In the variable-delay circuit shown in FIG. 6A, the optical switch $6_1$ couples the supplied data signal to one of the optical paths (the waveguides or optical fibers) having different propagation times. The selection of the optical path is carried out in response to a control signal.

Figure 6B:
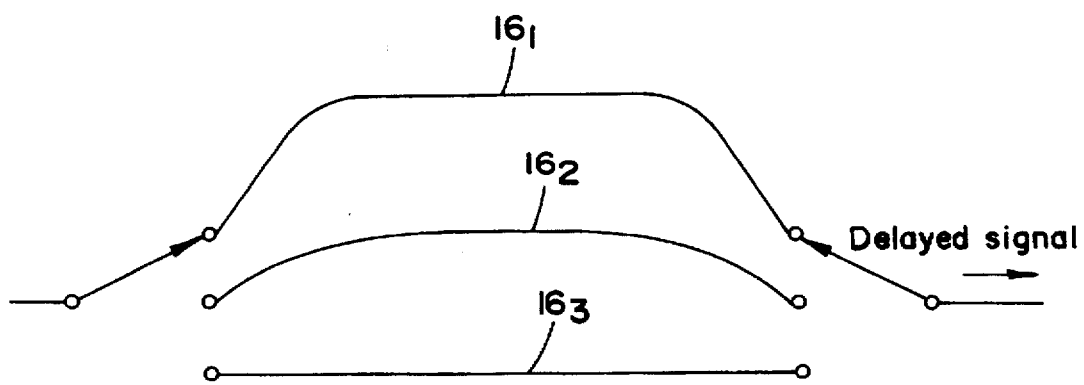

In the variable-delay circuit shown in FIG. 6B, the optical switch arranged at the output end couples selectively one of a plurality of the optical paths to an output optical waveguide. It is of course that the two switches are operated to select both ends of the same optical path at the same time in response to a control signal.

Such an optical switch can be made up of for example optical couplers.

The above described variable-delay circuits are made up of a plurality of optical paths having different propagation times, and an optical signal is transmitted over one of the plurality of optical paths selected in response to a control signal.

It is not imperative to use a plurality of optical paths. It is important that the propagation time of the optical signal (the optical data signal or the optical clock signal) be variable under control of a control signal.

Accordingly, it is possible to employ a single optical path whose propagation time can be changed by a control signal.

One of such examples of the variable-delay circuit is provided with a single optical path made of an optical waveguide or an optical fiber having a refractive index variable by changing the temperature of the optical path.

Another example of this type of variable-delay circuit has a single optical path made from material whose crystal structure is variable depending on an applied electric field. The propagation time varies depending on a change of the crystal structure. $LiNbO_3$ is suitable for this type of optical waveguide.

Further example of the variable-delay circuit is provided with a single optical path made of an optical fiber which is elongated by tensile load.

Figure 7:
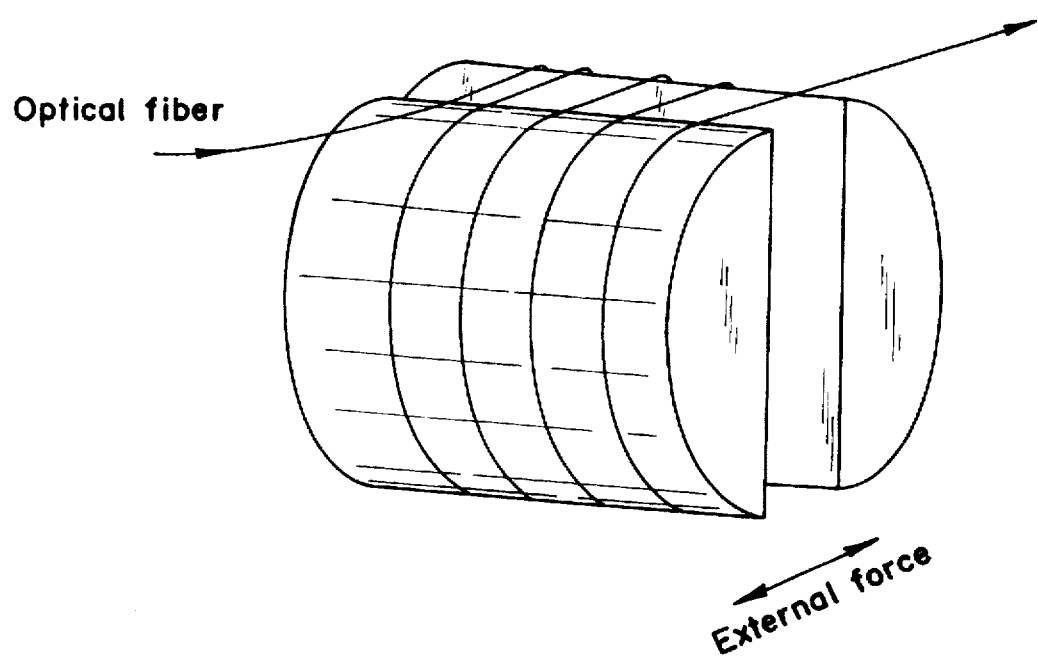
FIG. 7 shows an example of a variable-delay circuit the propagation time which is controlled by a tensile force.

FIG. 7 shows an example of a variable-delay circuit the propagation time of which is controlled by a tensile force.

The propagation time varies depending on variation of the length of the optical fiber caused by the tensile load.

For this purpose, an optical fiber is wound around a longitudinally bisected drum. The tensile force is applied to the wound optical fiber by forcing the half drums to separate from or approach to each other.

It is to be understood, however, that although the characteristics advantages of the present invention have been set forth in the foregoing description, the disclosure is illustrative only, and changes may be made in the arrangement of the parts within the scope of the appended claims.

What is claimed:

1. An optical regenerative circuit, comprising branching means for supplying a received optical data signal to two branch circuits, optical clock generator means for generating an optical clock signal from a first optical data signal, said first optical data signal being the optical data signal supplied to a first branch circuit of said two branch circuits, optical discriminating means for discriminating in an optical form a logic level of a second optical data signal in synchronization with said optical clock signal produced by said optical clock generator means, said second optical data signal being the optical data signal supplied to a second branch circuit of said two branch circuits, and variable-delay means for adjusting timings at which said second optical data signal and said optical clock signal are received by said optical discriminating means, by delaying a predetermined one of said first optical data signal, the second optical data signal and said optical clock signal so that said timings are synchronized with each other, said variable-delay means having at least one optical path to pass said predetermined one of said first optical data signal, said second optical data signal and said optical clock signal, the propagation time of said at least one optical path being controlled by means of a control signal to establish a delay time of said predetermined one of said first optical data signal, said second optical data signal and said optical clock signal.

2. An optical regenerative circuit as claimed in claim 1, wherein said variable-delay means having a plurality of optical paths of different propagation times, and a delay time of said predetermined one of said first optical data signal, said second optical data signal and said optical clock signal being established by selecting one of said plurality of optical paths as an optical path of said predetermined one of said first optical data signal, said second optical data signal and said optical clock signal, wherein the selection of said optical path is executed under control of a control signal.

3. An optical regenerative circuit as claimed in claim 1, wherein said variable-delay means delays said optical clock signal produced by said optical clock generator means, and said optical discriminating means discriminates a logic level of said second optical data signal in synchronization with said optical clock signal delayed by said variable-delay means.

4. An optical regenerative circuit as claimed in claim 1, wherein said variable-delay means delays said first optical data signal, optical clock generator means generates an optical clock signal from the first optical data signal delayed by said variable-delay means, and optical discriminating means discriminates a logic level of said second optical data signal in synchronization with said optical clock signal produced by said optical clock generator.

5. An optical regenerative circuit as claimed in claim 1, wherein optical clock generator means generates an optical clock signal from said first optical data signal, variable-delay means delays said second optical data signals, optical discriminating means discriminates a logic level of said second optical data signal delayed by said variable-delay means in synchronization with said optical clock signal produced by said optical clock generator means.

6. An optical regenerative circuit as claimed in claim 2, wherein said variable-delay means is provided with:

a plurality of optical waveguides having a different propagation time, each of said waveguides having an optical blocking means for passing or blocking an optical signal in accordance with a control signal; optical coupling means for coupling the output ends of said plurality of optical waveguides to an optical waveguide to transmit the output of said variable-delay means; and distributing means for distributing a received optical signal to supply to each of said plurality of optical waveguides.

7. An optical regenerative circuit as claimed in claim 2, wherein said variable-delay means is provided with:

a plurality of optical fibers having a different propagation time, each of said fibers having an optical blocking means for passing or blocking an optical signal in accordance with a control signal; optical coupling means for optically coupling the output ends of said plurality of optical fibers to an optical fiber to transmit the output of said variable-delay means; and distributing means for distributing a received optical signal to supply to each of said plurality of optical fibers.

8. An optical regenerative circuit as claimed in claim 2, wherein said variable-delay means is provided with:

a plurality of optical waveguides having a different propagation time; optical coupling means for coupling the output ends of said plurality of optical waveguides to an optical waveguide for coupling the output of said variable-delay means to the next stage; and selectively supplying means for supplying a received optical signal selectively to one of said plurality of optical waveguides in response to an externally supplied control signal.

9. An optical regenerative circuit as claimed in claim 2, wherein said variable-delay means is provided with:

a plurality of optical fibers having a different propagation time; optical coupling means for coupling the output ends of said plurality of optical fibers to an optical fiber for coupling the output of said variable-delay means to the next stage; and selectively supplying means for supplying a received optical signal selectively to one of said plurality of optical fibers in response to an externally supplied control signal.

10. An optical regenerative circuit as claimed in claim 1, wherein said variable-delay means has a single optical waveguide, as said at least one optical path, having a propagation time which depends on a dielectric constant of the waveguide, said dielectric constant varying in response to an externally supplied control signal, and a delay time of said predetermined one of said first optical data signal, said second optical data signal and said optical clock signal being established by selecting the value of said dielectric constant by means of said control signal.

11. An optical regenerative circuit as claimed in claim 1, wherein said variable-delay means has a single optical fiber, as said at least one optical path, having a propagation time which depends on an optical path length of the optical fiber, said optical path length varying in response to a magnitude of an externally applied tensile force, and a delay time of said predetermined one of said first optical data signal, said second optical data signal and said optical clock signal being established by selecting the magnitude of said tensile force under control of an control signal.

* * * * *